United States Patent
Zwaal (10) Patent No.: US 9,459,941 B2
(45) Date of Patent: Oct. 4, 2016

(54) APPARATUS AND METHOD FOR SYNCHRONIZING THE PROCESSING OF EVENTS ASSOCIATED WITH APPLICATION SESSIONS IN A TELECOMMUNICATIONS NETWORK

(75) Inventor: Frederik Hugo Zwaal, Breda (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 956 days.

(21) Appl. No.: 13/383,494

(22) PCT Filed: Jul. 28, 2009

(86) PCT No.: PCT/EP2009/059753
§ 371 (c)(1), (2), (4) Date: Feb. 2, 2012

(87) PCT Pub. No.: WO2011/012157
PCT Pub. Date: Feb. 3, 2011

(65) Prior Publication Data
US 2012/0284725 A1    Nov. 8, 2012

(51) Int. Cl.
*G06F 9/52* (2006.01)
*G06F 9/54* (2006.01)
(Continued)

(52) U.S. Cl.
CPC .............. *G06F 9/546* (2013.01); *G06F 9/5027* (2013.01); *G06F 9/52* (2013.01); *G06F 9/4812* (2013.01);
(Continued)

(58) Field of Classification Search
CPC ........ G06F 9/5027; G06F 9/546; G06F 9/52; G06F 9/526; G06F 9/54; G06F 9/541; G06F 9/542; G06F 9/5812
USPC ................................. 718/102, 100, 104, 107
See application file for complete search history.

(56) References Cited

U.S. PATENT DOCUMENTS 6,687,729 B1  2/2004 Sievert et al.
7,225,249 B1 * 5/2007 Barry .................. G06F 17/3089
                                                                  709/227
(Continued)

FOREIGN PATENT DOCUMENTS

CN          101364190 A       2/2009
FR    WO 2007051935 A1 *   5/2007  ........... G06F 9/3851
(Continued)

OTHER PUBLICATIONS

Tanenbaum A S, "Modern Operating Systems, Passage." Modern Operating Systems, Englewood Cliffs, Prentice Hall, US, Jan. 1, 1992, pp. 33-61.

*Primary Examiner* — Abu Ghaffari
(74) *Attorney, Agent, or Firm* — Coats & Bennett, PLLC (57) ABSTRACT

A processing platform, for example a Java Enterprise Edition (JEE) platform comprises a JEE cluster (1) having a plurality of processors (3), which include a resource adapter (11) for handling events associated with one or more application sessions Si to Sn. Each application session Si to Sn comprises a session state (15) and an event queue (17), the event queue (17) containing a list of events to be executed for a particular one of the sessions $S_1$ to $S_n$. A thread pool (19) comprises one or more processing threads $t_1$ to $t_N$ for enabling the processor (3) to perform multiple tasks in parallel. The thread pool (19) comprises a task queue (21) containing the tasks to be executed by the processing threads $t_1$ to $t_N$. The resource adapter (11) comprises a synchronizing unit (23) for controlling how the plurality of threads $t_1$ to $t_N$ from the thread pool handle the events in the plurality of application sessions $S_1$ to $S_n$. In particular, the synchronizing unit (23) is configured such that only one event queued in an event queue (17) has a task scheduled thereto in the task queue (21), thereby preventing more than one event from a particular event queue of an application session being executed in parallel.

22 Claims, 9 Drawing Sheets

(51) Int. Cl.
  *G06F 9/50*  (2006.01)
  *G06F 9/48*  (2006.01)

(52) U.S. Cl.
  CPC .............. *G06F 9/526* (2013.01); *G06F 9/54* (2013.01); *G06F 9/542* (2013.01); *G06F 2209/5018* (2013.01)

(56) References Cited

U.S. PATENT DOCUMENTS

| | | | |
|---|---|---|---|
| 7,444,635 B2* | 10/2008 | Lehtinen | 718/104 |
| 7,769,800 B2* | 8/2010 | Ribeiro et al. | 709/200 |
| 7,990,974 B1* | 8/2011 | Gmuender | G06F 9/5044 370/230 |
| 8,200,765 B2 | 6/2012 | Bittles et al. | 709/206 |
| 8,281,014 B2* | 10/2012 | Stanev et al. | 709/227 |
| 8,584,126 B2* | 11/2013 | Ang et al. | 718/102 |
| 2002/0099776 A1* | 7/2002 | Cafarella | H04L 29/06027 709/206 |
| 2002/0194249 A1* | 12/2002 | Hsieh | G06F 5/065 718/103 |
| 2003/0110230 A1 | 6/2003 | Holdsworth et al. | |
| 2003/0158883 A1 | 8/2003 | Drudis et al. | |
| 2004/0010551 A1* | 1/2004 | Dorland | G06F 9/4881 709/206 |
| 2004/0015974 A1* | 1/2004 | Jeyaraman | G06F 9/5027 718/104 |
| 2004/0024894 A1* | 2/2004 | Osman | H04L 69/16 709/230 |
| 2005/0081200 A1* | 4/2005 | Rutten et al. | 718/100 |
| 2005/0262507 A1* | 11/2005 | Langen | G06F 9/4881 718/100 |
| 2007/0073720 A1* | 3/2007 | Clarke | G06F 9/546 |
| 2007/0283358 A1* | 12/2007 | Kasahara | G06F 9/5044 718/104 |
| 2008/0010645 A1* | 1/2008 | Gupta | G06F 9/5027 719/312 |
| 2009/0083752 A1* | 3/2009 | Wu | G06F 9/542 718/106 |
| 2009/0282408 A1* | 11/2009 | Joffe | G06F 9/3851 718/100 |

FOREIGN PATENT DOCUMENTS

| | | |
|---|---|---|
| JP | 2001117839 A | 4/2001 |
| JP | 2003518286 A | 6/2003 |
| JP | 2009075808 A | 4/2009 |

* cited by examiner

APPARATUS AND METHOD FOR SYNCHRONIZING THE PROCESSING OF EVENTS ASSOCIATED WITH APPLICATION SESSIONS IN A TELECOMMUNICATIONS NETWORK

TECHNICAL FIELD

The present invention relates to an apparatus and method for processing events in a telecommunications network, and in particular to a method and apparatus for synchronising the processing of events associated with application sessions in a telecommunications processing platform, for example a Java Enterprise Edition (JEE) processing platform.

BACKGROUND

In telecommunications networks there exist many applications and services in order to provide extra functionality in addition to regular phone calls. These applications and services typically run on separate servers that are connected to the telecommunications network. These servers typically run on different platforms than the telecommunications network itself.

One such platform is the Java Enterprise Edition (JEE) platform, which is a development of the standard Java platform. JEE is a widely used platform for server programming in the Java programming language. The JEE Platform differs from the standard Java Platform in that it adds libraries which provide functionality to deploy fault-tolerant, distributed, multi-tier Java software, based largely on modular components running on an application server. A feature of the JEE platform is that it allows multiple processing threads to run in parallel, thereby increasing the throughput of task execution.

Although the JEE platform is suited for many applications, it can be impractical for certain telecommunication services, as described below.

The handling of telecommunication protocols typically requires the use of state machines associated with application sessions. For these state machines it is necessary to only receive one message at a time, so that the state is not corrupted. The JEE platform as such does not provide means for handling messages on a particular application session one at a time. On the contrary, the JEE platform will typically start as many parallel threads as there are messages to be processed.

Figure 1:
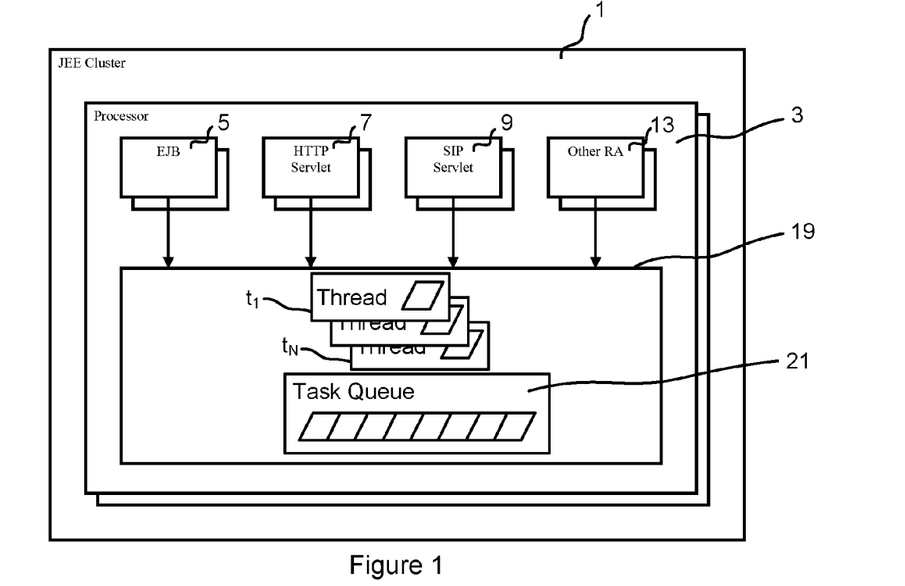
FIG. 1 shows a typical architecture of a known JEE cluster.

FIG. 1 shows a typical JEE cluster 1 comprising multiple processors 3. The processors 3 may be identical and share the load of the JEE cluster 1. When used as a telecommunications processing platform each processor 3 will typically comprise several containers, for example Enterprise Java Beans 5 (EJB), HTTP servlet 7, a Session Initiation Protocol (SIP) Servlet 9 or other execution units 13, such as other resource adapters for communicating with legacy systems.

The architecture shown in FIG. 1 comprises a thread pool 19. The thread pool 19 comprises one or more processing threads $t_1$ to $t_N$ for enabling the processor 3 to perform multiple tasks in parallel. The thread pool 19 also comprises a task queue 21 containing a set of tasks to be executed by the threads $t_1$ to $t_N$. Each processing thread $t_1$ to $t_N$ handles one task at a time.

As mentioned above, a JEE platform is configured to try and execute as many tasks in parallel as there are threads defined in the system. This can be problematic when a JEE platform as described in FIG. 1 is being used to handle telecommunication applications and services, whereby a session state can become invalid when multiple threads $t_1$ to $t_N$ execute multiple events associated with application sessions in parallel. In other words, the events in an application session are concurrently updating the same session state.

One method of ensuring event synchronisation is to use locks or semaphores to prevent events in an application session from concurrently updating the same session state. As such, when one thread $t_1$ to $t_N$ is processing an event associated with a particular application session, all other threads must wait until the one thread is finished. This has the disadvantage of causing many threads $t_1$ to $t_N$ to be waiting, which is not an optimal use of system resources, and generally in conflict with the JEE platform principles.

Another method of ensuring event synchronisation is to assign just one thread of the plurality of threads $t_1$ to $t_N$ to each application session. As such, each application session has a dedicated thread for handling its events. However, such a solution has the disadvantage of foregoing the thread pooling mechanism, and therefore violates an important JEE platform principle that governs that all resources (including threads) must be managed. This solution also has the disadvantage of using much more threads $t_1$ to $t_N$ than necessary, and is therefore not resource efficient.

It will be appreciated from the above that implementing event synchronization is problematic without compromising resource efficiency.

SUMMARY

It is an aim of the present invention to provide a method and apparatus for synchronising the processing of events in a processing platform for use in a telecommunications network, in a resource efficient manner.

According to one aspect of the present invention, there is provided a method of synchronising the processing of events associated with application sessions in a telecommunications processing platform, wherein the telecommunications processing platform has a plurality of processing threads for handling multiple tasks in parallel, and wherein the tasks are stored in a task queue. The method comprises the steps of storing one or more events in an event queue associated with a particular application session, and assigning a task in the task queue for only one event in the event queue of a particular application session.

The invention has the advantage of avoiding events being handled concurrently, since only one event in an event queue of a particular application session has a task assigned thereto. The invention also has the advantage of not requiring any modifications to the manner in which an existing thread pool per se handles the processing of tasks from a task queue.

Storing an event in the event queue may comprise the steps of determining if the event is the first event in the event queue and, if so, assigning a task in the task queue for that particular event.

Removing a processed event from the event queue may comprise the steps of determining if the event queue is empty and, if not, assigning a task in the task queue for another event in the event queue. The step of assigning a task may comprise the step of assigning a task to the next event in the event queue.

The steps of storing an event in an event queue and determining if the event is the first event in the event queue may be performed as an indivisible action. This has the advantage of avoiding race conditions.

The steps of removing an event from an event queue and determining if the event queue is empty may be performed as an indivisible action. This also has the advantage of avoiding race conditions.

According to one aspect of the invention a lock may be provided to perform the indivisible action. Alternatively, an atomic counter may be used to perform the indivisible action. The atomic counter has a count value that is incremented or decremented during respective storing or removing steps, the count value indicating whether the event queue is empty or whether an event is the first event in the event queue.

The method may be used in a telecommunications processing platform having a Java Enterprise Edition (JEE) processing platform.

According to another aspect of the present invention, there is provided a resource adapter for use in a telecommunications processing platform having a plurality of processing threads for processing multiple tasks in parallel, the tasks being stored in a task queue. The resource adapter comprises one or more event queues. Each event queue is associated with an application session, and adapted to store one or more events associated with its corresponding application session. The resource adapter comprises a synchronising unit for synchronising the processing of events in an event queue, the synchronising unit being configured to assign a task in the task queue for only one event in an event queue.

According to another aspect of the present invention there is provided a JEE cluster comprising a resource adapter as claimed in the appended claims, or adapted to perform a method as claimed in the appended claims.

The invention has the advantage of efficiently using a thread pool to handle events from multiple queues, without unnecessarily blocking threads, yet at the same time handling as many events (from different application sessions) in parallel as possible. The invention is also free of deadlock and livelock.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

The invention described below will be made in the context of a JEE platform. It will be appreciated, however, that the invention is also applicable to other forms of platforms that handle the processing of events and sessions in combination with thread pools, i.e. by any session framework that employs event handling. Furthermore, although the invention is described in the context of a telecommunications environment, the invention is also applicable to other applications having similar problems.

According to the present invention, event synchronisation is achieved by providing a resource adapter that is specifically designed for handling application sessions, and by queuing events in an event queue associated with a particular application session, and only scheduling one task at a time for handling an event from that event queue. For example the events may be queued in a FIFO queue and only scheduling one task at a time for handling the first event in the event queue.

Figure 2:
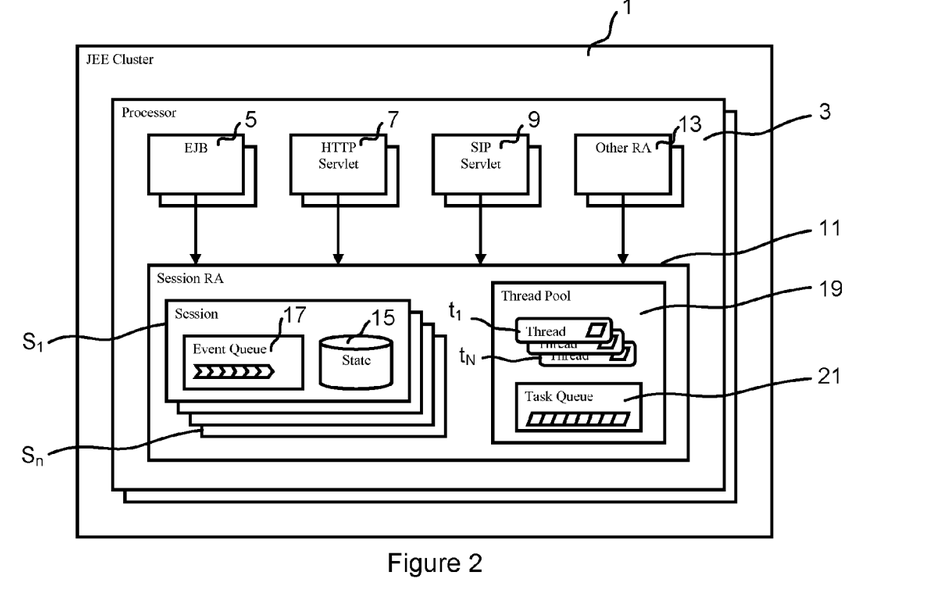
FIG. 2 shows a JEE architecture having a resource adapter for handling application sessions.

FIG. 2 shows a JEE cluster 1 comprising multiple processors 3, each processor 3 typically comprising several containers, for example Enterprise Java Beans 5 (EJB), HTTP servlet 7, a Session Initiation Protocol (SIP) Servlet 9 or other execution units 13, such as resource adapters for communicating with legacy systems. The architecture of FIG. 2 is also shown as comprising a session resource adapter 11 which is provided for handling application sessions.

The resource adapter 11 comprises one or more application sessions $S_1$ to $S_n$. Each application session $S_1$ to $S_n$ comprises a session state 15 and an event queue 17, the event queue 17 containing a list of events to be executed for a particular one of the application sessions $S_1$ to $S_n$. By way of example, an "application session" may be created when a new call is being initiated in a telecommunications system. Therefore, an application session can be a form of service that is associated with the call being initiated, for example to play an announcement to a calling party. Also by way of example only, an "event" is a term associated with events that occur during a call, for example a called party answering the call, a called party keying-in information on their phone, and so forth. It is noted that these are merely examples of what can be considered a session or an event, and that the invention is intended to embrace any form of application session or event that can be processed, and include telecommunication, SIP or web based sessions and events.

The resource adapter 11 uses a thread pool 19. The thread pool 19 may be provided in the resource adapter 11 or shared with other components in the system. The thread pool 19 comprises one or more processing threads $t_1$ to $t_N$ for enabling the processor 3 to perform multiple tasks in parallel. The thread pool 19 also comprises a task queue 21 containing a queue of tasks to be executed by the threads $t_1$ to $t_N$. Each processing thread $t_1$ to $t_N$ handles one task at a time. It is noted that in a typical telecommunications application the number of threads $t_1$ to $t_N$ is typically much lower than the number of application sessions $S_1$ to $S_n$.

As mentioned above, a JEE platform is configured to try and execute as many tasks in parallel as there are threads defined in the system. This can be problematic even when a JEE platform as described in FIG. 2 is being used to handle telecommunication services, since a session state can become invalid when multiple threads $t_1$ to $t_N$ execute multiple events from a particular application session $S_1$ to $S_n$ in parallel. In other words, the events in an application session are concurrently updating the same session state.

As mentioned above with reference to FIG. 1, one method of ensuring event synchronisation would be to use locks or semaphores to create a mutual exclusion on the event queue 17 of a particular application session $S_1$ to $S_n$. As such, when one thread $t_1$ to $t_N$ is accessing an event queue 17 of a particular application session $S_x$, (i.e. handling the next event), all other threads must wait until the one thread is finished. This has the disadvantage of causing many threads $t_1$ to $t_N$ to be waiting, thereby not using system resources optimally, which is in conflict with the JEE platform principles.

Also as mentioned above, another method of ensuring event synchronisation would be to assign just one thread of the plurality of threads $t_1$ to $t_N$ to each application session $S_1$ to $S_n$. As such, each application session $S_1$ to $S_n$ has a dedicated thread handling events from its event queue 17. However, such a solution has the disadvantage of foregoing the thread pooling mechanism, and therefore violates an important JEE platform principle that governs that all resources (including threads) must be managed. This solution also has the disadvantage of using much more threads $t_1$ to $t_N$ than necessary, and is therefore not resource efficient.

Figure 3:
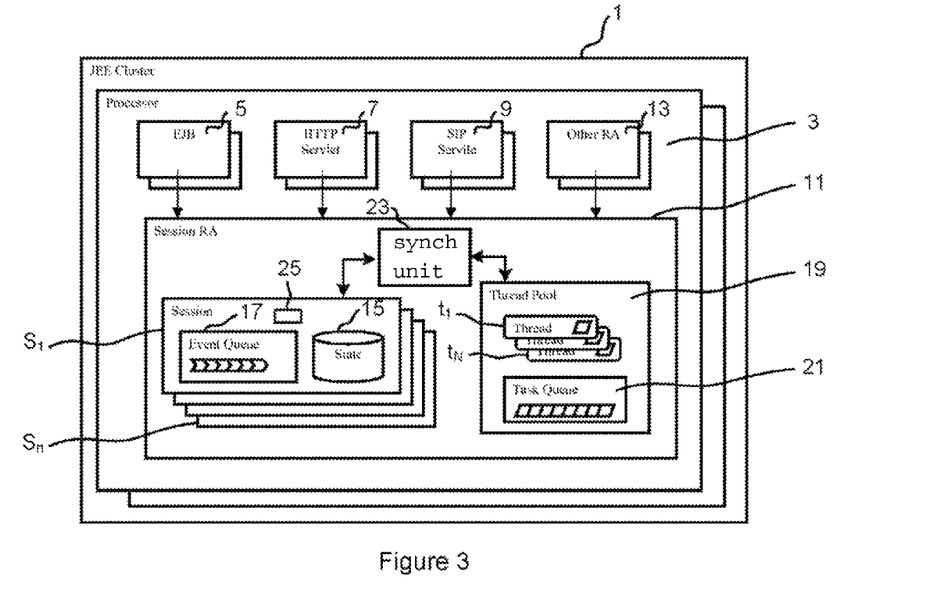
FIG. 3 shows a resource adapter according to an embodiment of the present invention.

FIG. 3 shows an architecture for use with an embodiment of the present invention. As shown in FIG. 2 a JEE platform comprises a JEE cluster 1 having a plurality of processors 3. The processors 3 may be identical, although this is not a necessity, and the processors 3 can share the load of the JEE cluster 1. A processor 3 may comprise one or more containers, for example Enterprise Java Beans 5 (EJB), HTTP servlet 7, a Session Initiation Protocol (SIP) Servlet 9 or other execution units 13, such as other resource adapters for communicating with legacy system. As shown in FIG. 2, a processor may also comprise a session resource adapter 11.

In the architecture shown in FIG. 3 a resource adapter 11 for handling application sessions comprises one or more application sessions $S_1$ to $S_n$. Each application session $S_1$ to $S_n$ comprises a session state 15 and an event queue 17, the event queue 17 containing a set of events to be executed for a particular one of the application sessions $S_1$ to $S_n$.

The session state 15 and the event queue 17 are stored in memory. According to one embodiment, the session state may be kept in memory on the processor where the application session was initiated (and where an associated communication session typically resides). Using this form of processor affinity has the advantage that events need not be routed (over the local network) from one processor to the other unnecessarily. Moreover, the session state need not be distributed in the cluster and will automatically cease to exist when the processor it resides on crashes. It is noted that the session state and event queue may be stored elsewhere without departing from the scope of the invention.

In the embodiment shown in FIG. 3 the resource adapter 11 also comprises a thread pool 19. The thread pool 19 comprises one or more processing threads $t_1$ to $t_N$ for enabling the processor 3 to perform multiple tasks in parallel. The thread pool 19 also comprises a task queue 21 containing the tasks to be executed by the processing threads $t_1$ to $t_N$. Each processing thread $t_1$ to $t_N$ handles one task at a time. The processor may have any number of application sessions $S_1$ to $S_n$ and any number of threads $t_1$ to $t_N$. It is noted that the thread pool 19 can be dedicated to the resource adapter 11, or shared with other components on the processor 3. In addition, although the thread pool 19 is shown as being part of the resource adapter 11 in FIG. 3, it is noted that the thread pool 19 could also reside elsewhere in the system, i.e. whereby the resource adapter 11 shares the use of the thread pool 19 that resides elsewhere.

According to the invention the resource adapter 11 comprises a synchronising unit 23 for controlling how the plurality of threads $t_1$ to $t_N$ from the thread pool handle the events in the plurality of application sessions $S_1$ to $S_n$. In a further embodiment, each application session may comprise means 25 for preventing race conditions, or enabling certain steps to be performed in an indivisible manner, for example using a counter 25 such as an atomic counter, which will be described later in the application with reference to FIGS. 7 and 8.

As mentioned above with respect to FIG. 2, without the synchronising unit 23 of FIG. 3 the JEE platform has no control over the processing threads $t_1$ to $t_N$ in the thread pool 19, which would result in a thread pool 19 draining the plurality of event queues 17 of the application sessions $S_1$ to $S_n$ as quickly as possible using as many of the available threads $t_1$ to $t_N$ as possible, thus running the risk of handling multiple events from an event queue 17 of a particular application session in parallel.

However, the synchronising unit 23 according to the present invention is configured such that a task is not scheduled for each event in the event queue 17 of an associated application session. Instead, the synchronising unit 23 is configured such that only one event from an event queue 17 of an application session $S_1$ to $S_n$ has a task assigned to it. For example, when the events are stored in an event queue 17 in the form of a first-in-first-out FIFO queue, the synchronising unit 23 is configured to control the operation of the resource adapter 11 such that only the first event in an event queue 17 has a task scheduled in the task queue 21 associated with the thread pool 19.

Figure 4:
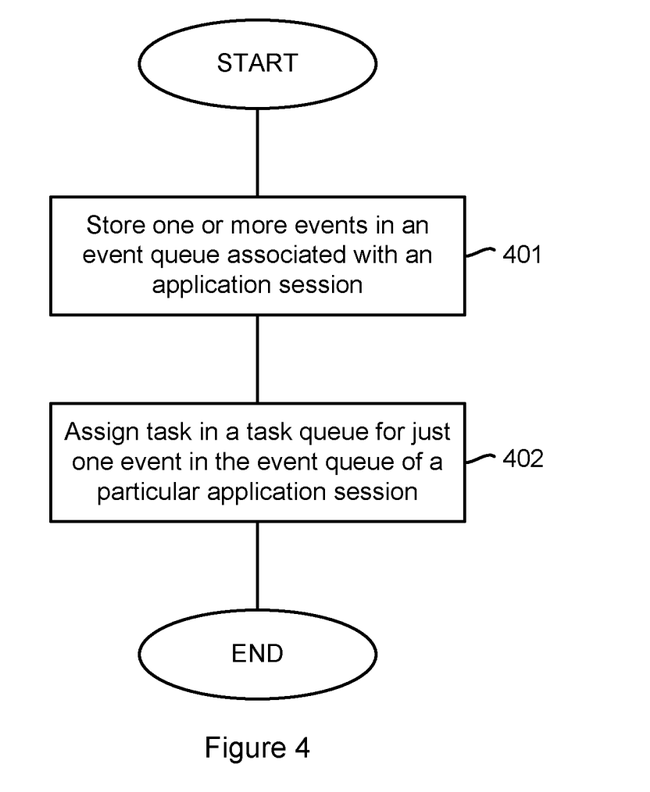
FIG. 4 shows the steps performed in a method according to an embodiment of the present invention.

FIG. 4 shows the steps performed by an embodiment of the invention. In step 401 one or more events are stored in an event queue associated with an application session. As shown in step 402, a task in a task queue is assigned for only one event in the event queue of a particular application session. Examples showing how this may be carried out are described below.

There are two main occasions when the synchronising unit 23 ensures that only one event from an event queue has a task assigned thereto. One such occasion relates to when an event is being added to an event queue, i.e. stored or inserted into an event queue. Another occasion relates to when an event is being removed from an event queue, i.e. after an event from the event queue has been processed by a thread.

Figure 5:
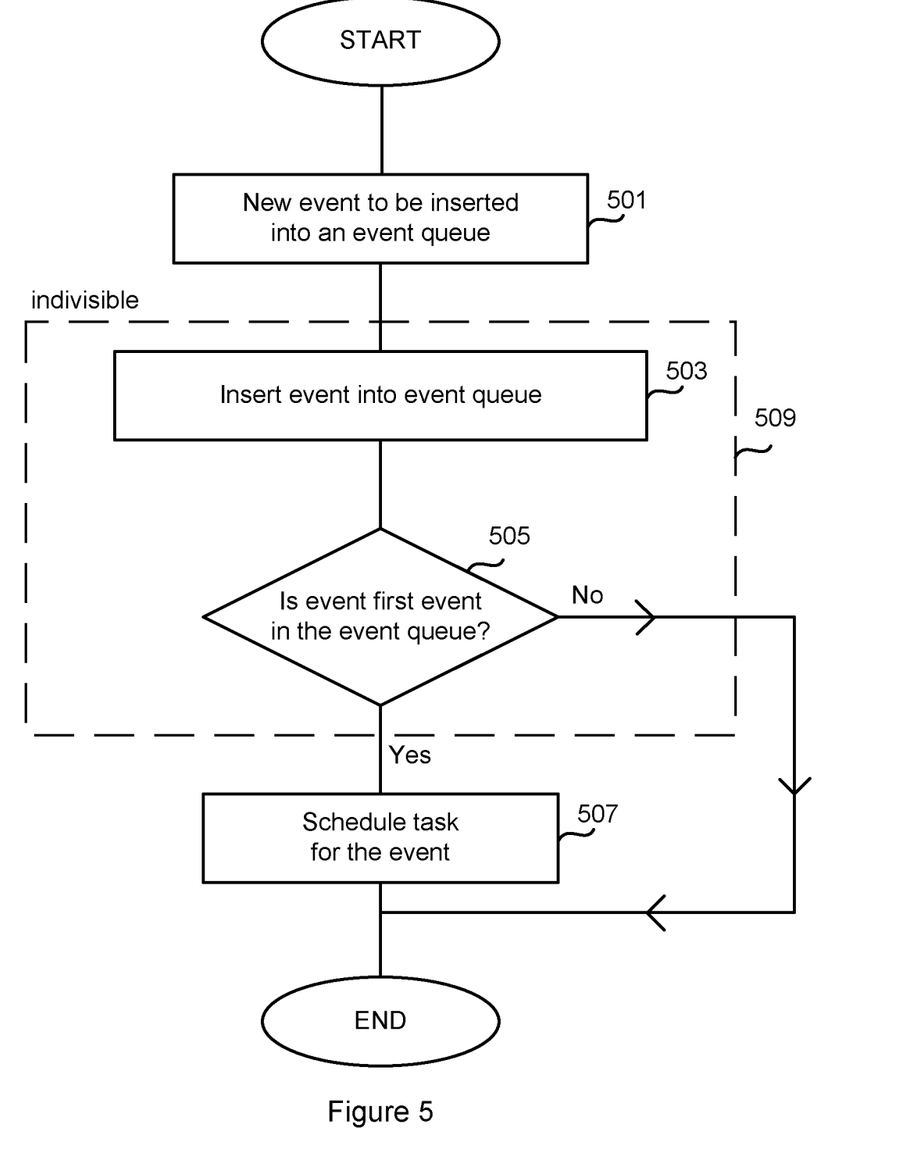
FIG. 5 shows the steps performed in a method according to one aspect of the present invention.

FIG. 5 shows the steps performed when inserting an event into an event queue. At step 501 it is determined that a new event is to be inserted into an event queue of a particular application session. The synchronising unit 23 is configured to first store the event in the event queue in step 503. Subsequently, the synchronising unit 23 is configured to determine whether the inserted event is the first event in the event queue in step 505. If not, the synchronising unit 23 does not schedule a task in the task queue for that particular event. However, if it is determined in step 505 that the event is the first event in the queue, the synchronising unit 23 schedules a task in the task queue for that event, step 507. As such, it will be appreciated that only the first event in an event queue has a task assigned to it in the task queue.

As described later in the application, preferably the steps of inserting or storing an event into the queue (step 503) and determining whether the event is the first event in the queue (step 505) are indivisible actions. In other words, the steps are performed in such a way that they are executed without any other processing threads in the system having any influence on their execution.

Figure 6:
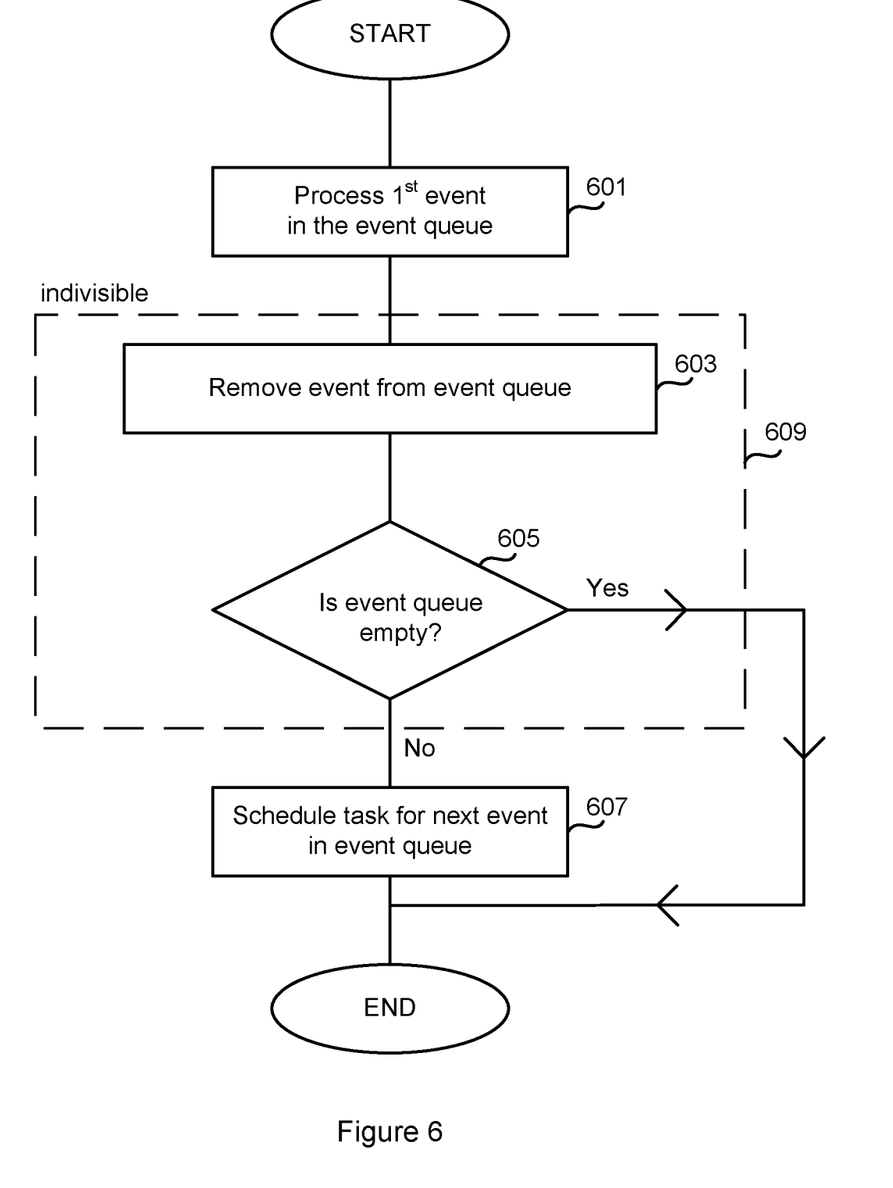
FIG. 6 shows the steps performed according to another aspect of the present invention.

FIG. 6 shows the steps performed when handling an event from an event queue, and the subsequent processing steps. It is appreciated that one or more events have been inserted in the event queue as described above with reference to FIG. 5. In step 601 the event having a task assigned thereto in the task queue, that is the first event in the event queue, is processed by a thread. After processing the event the event is then removed from the event queue, step 603. The synchronising unit 23 then determines in step 605 whether the event queue is empty. If it is determined in step 605 that the event queue is not empty, the synchronising unit 23 is configured in step 607 to schedule a new task for another event in the event queue, for example the next event. The process shown in FIG. 6 continues by another thread (or the same thread) processing the first event in the event queue in step 601 until such time as it is determined in step 605 that there are no more events in the event queue, in which case the processing ends without scheduling a new task (i.e. because there are no events left in the event queue to schedule tasks for).

It can be seen from the above that a second event from a particular event queue can only be processed after the first event has been handled completely. In particular, the second event can only be handled after the first event has been removed from the queue (at which point the second event has become the first). To enable the desired function to be realised, an event is removed from the event queue after it has been handled.

As described later in the application, preferably the steps of removing an event from the event queue (step 603) and determining whether the event queue is empty (step 605) are indivisible actions. In other words, the steps are performed in such a way that they are executed without any other processing threads in the system having any influence on their execution.

The manner in which the synchronising unit 23 is configured implies that a distinction is made between a task executed by a thread and the event handling routine, which are normally the same.

It will be appreciated that, according to FIG. 6, a task is scheduled according to three distinct steps. The first is that an event handling routine is only executed for the first event in the queue. This event is then removed from its queue, and a check is then made to determine whether the queue has more events and, if so, a new task is created for the event queue and the task offered to the thread pool.

It will therefore be observed that there are two distinct places where tasks are scheduled to the task queue of a thread pool. A task for a "first event" in the event queue is always offered to the thread pool by the thread that inserted the event. A task for a "next event" is always offered to the thread pool by the thread that handled the "first event". This can lead to the presence of a race condition, where both threads must decide when the queue is empty: an inserting thread must decide whether the queue is empty before it inserts an event (i.e. because a task needs to be scheduled if the queue is empty): a removing thread must decide whether a queue is empty after it has removed an event (i.e. because a new task needs to be scheduled if the queue is not empty).

It could occur that the event queue contains one event (the one being handled) before the insertion, which is removed by the handling thread before the inserting thread could insert its event. Since the inserting thread did not see an empty queue, it will not schedule a task and no more events will be handled.

It could also occur that there are two (or more) inserting threads, both of which find the queue to be empty before inserting the event. Since both see an empty queue, both will schedule a task and two events will be handled at the same time.

The race conditions described above can be resolved by performing, as an indivisible action, the steps of inserting or storing an event in the event queue and determining whether the event is the first event in the event queue. Likewise, the race conditions can be resolved by performing, as an indivisible action, the steps of removing of an event from the event queue and determining whether the event queue is empty. These indivisible actions are shown as steps 509 and 609 in FIGS. 5 and 6, respectively.

Figure 7:
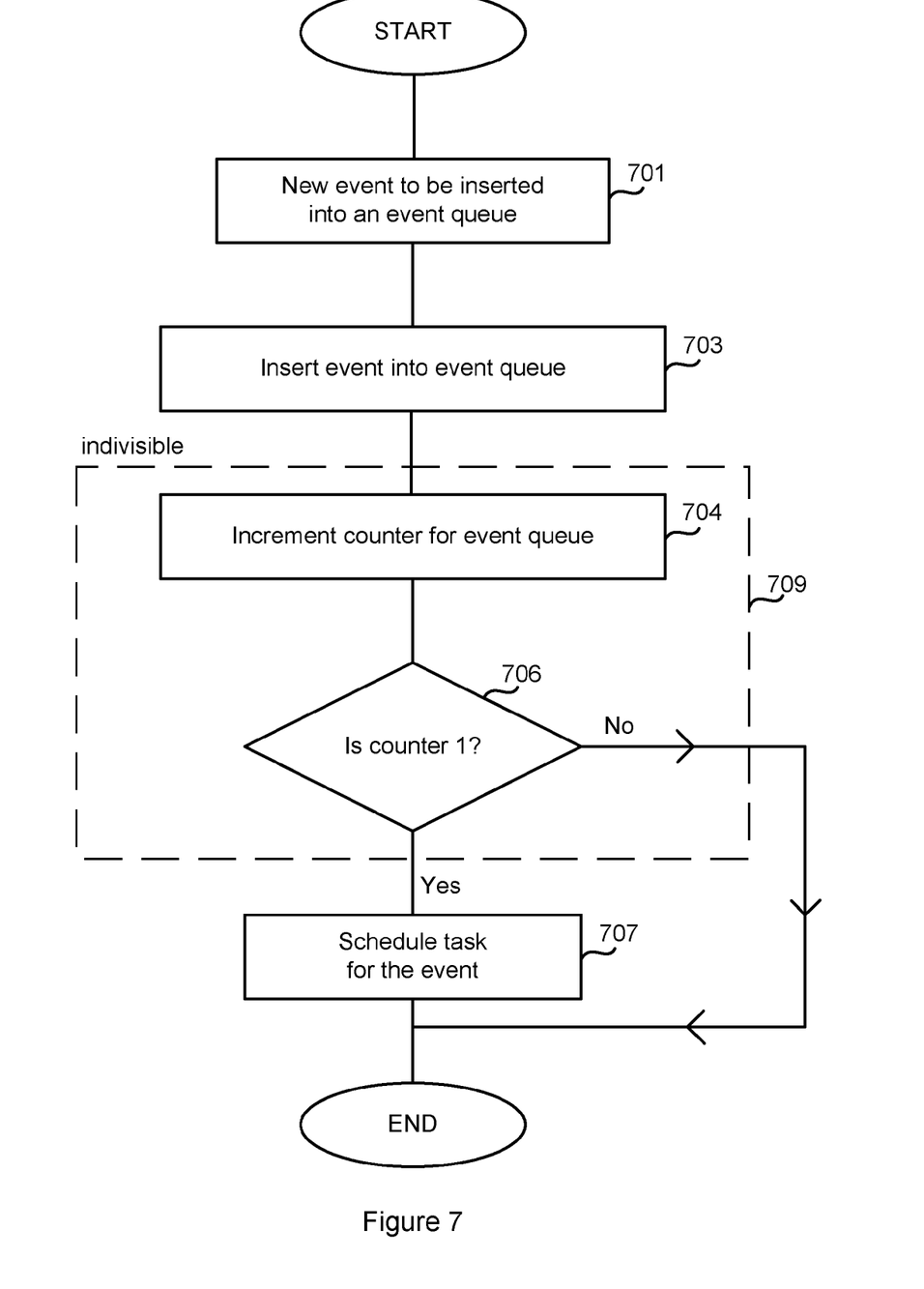
FIG. 7 shows the steps performed according to another aspect of the present invention.
Figure 8:
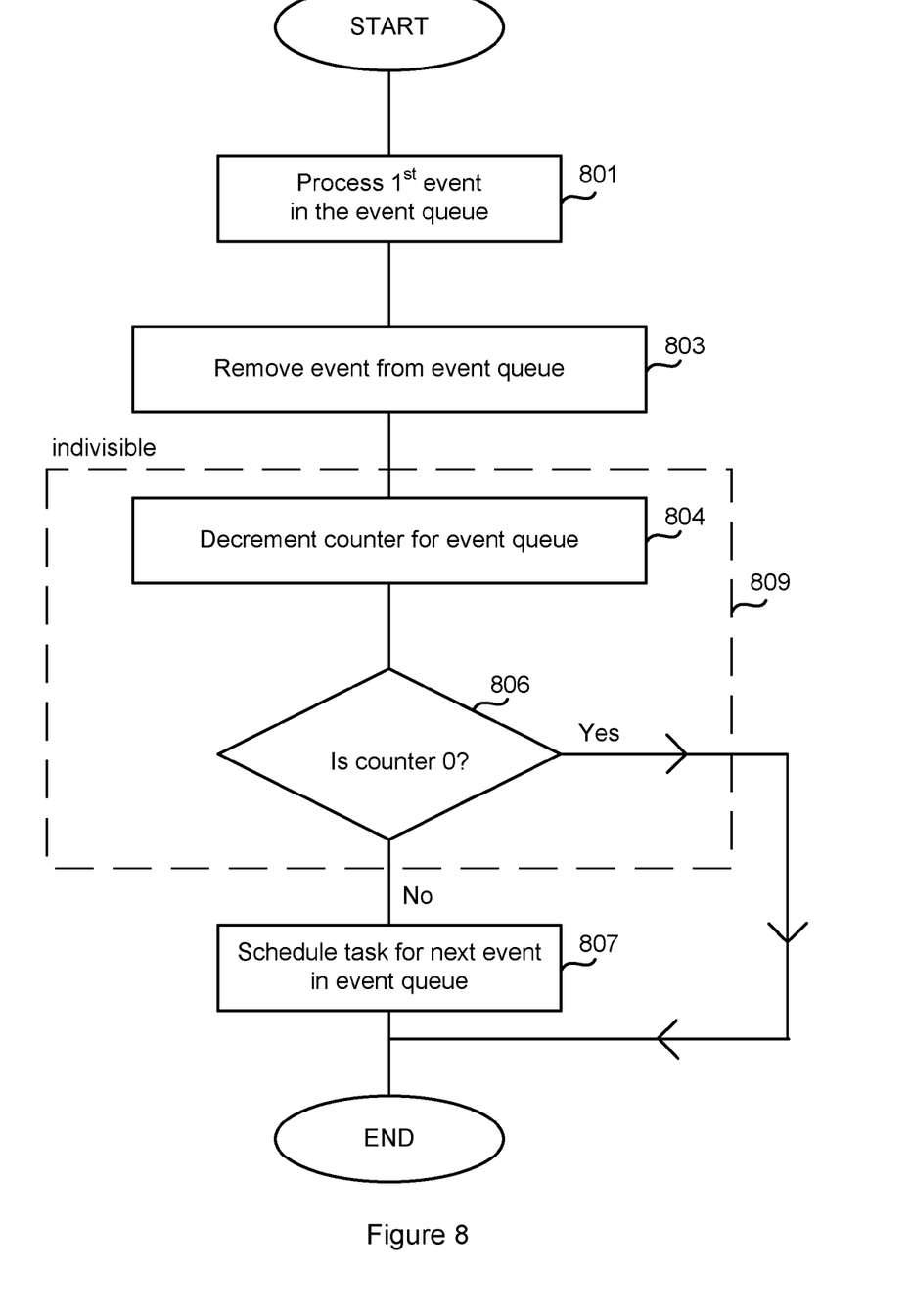
FIG. 8 shows the steps performed according to another aspect of the present invention.

FIGS. 7 and 8 describe the operation of a further embodiment of the invention having an atomic counter for avoiding the race conditions as described above.

In the further embodiment, the indivisible actions may be realised by an atomic counter to the event queue. A handling thread decrements the atomic counter and all inserting threads increment the atomic counter. Since incrementing and decrementing are atomic or indivisible operations that return the previous value, a thread can safely determine whether the queue is or was empty.

FIG. 7 shows the steps performed when inserting an event into an event queue. At step 701 it is determined that a new event is to be inserted into an event queue of a particular application session. The synchronising unit 23 is configured to first store the event in the event queue in step 703. The synchronising unit 23 is configured to increment the counter in step 704, indicating a further event has been added to the event queue. The synchronising unit 23 is further configured to determine in step 706 whether the event is the first event in the event queue by checking that the count value was zero prior to incrementing it, i.e. by checking whether the event queue was empty. If it is determined that the event is not the first event in the event queue, i.e. because a previous count value is not zero, the synchronising unit 23 does not schedule a task in the task queue for that particular event. If it is determined in step 706 that the event is the first event, i.e. because the previous counter value is zero, the synchronising unit 23 schedules a task in the task queue for that event, step 707. As such, it will be appreciated that the incrementing of a counter when inserting a new event into the event queue provides a clear indication regarding whether or not the event queue is empty.

FIG. 8 shows the steps performed when handling an event from an event queue, and the subsequent processing steps. It is appreciated that one or more events have been inserted in the event queue as described above with reference to FIG. 7, and that the counter therefore has a non-zero value. In step 801 the event having a task assigned thereto in the task queue, that is the first event in the event queue, is processed. After processing, the event is then removed from the event queue, step 803.

According to this embodiment of the invention the synchronising unit is configured to decrement the counter 25 which indicates whether the event queue is empty or not, step 804. The synchronising unit then determines in step 806 whether the event queue is empty, i.e. by checking the count value in the counter 25, to determine whether the count value is zero. If it is determined in step 806 that the event queue is not empty, the synchronising unit 23 is configured in step 807 to schedule a new task for another event in the event queue, for example the next event. In its turn, the new task executes the same steps as depicted in FIG. 8 in a new thread from the thread pool.

This process continues until such time as it is determined in step 806 that there are no more events in the event queue, i.e. the count value being zero, in which case the processing ends. It will be appreciated that the decrementing of a counter when removing an event from the event queue provides a clear indication regarding whether or not the event queue is empty.

Although a counter has been described as the means for indicating whether or not an event queue is empty, and therefore providing the realisation of the indivisibility of the steps shown in FIGS. 5, 6, 7 and 8, it will be appreciated that other means may be used to provide this indication, and hence avoid the race condition, for example the use of a lock, such as a semaphore.

It will be appreciated that the invention described above has the advantage of efficiently using a thread pool to handle events from multiple queues, without unnecessarily blocking threads, yet at the same handling as many events (from different sessions) in parallel as possible. The described system is also free of deadlock and livelock.

Figure 9:
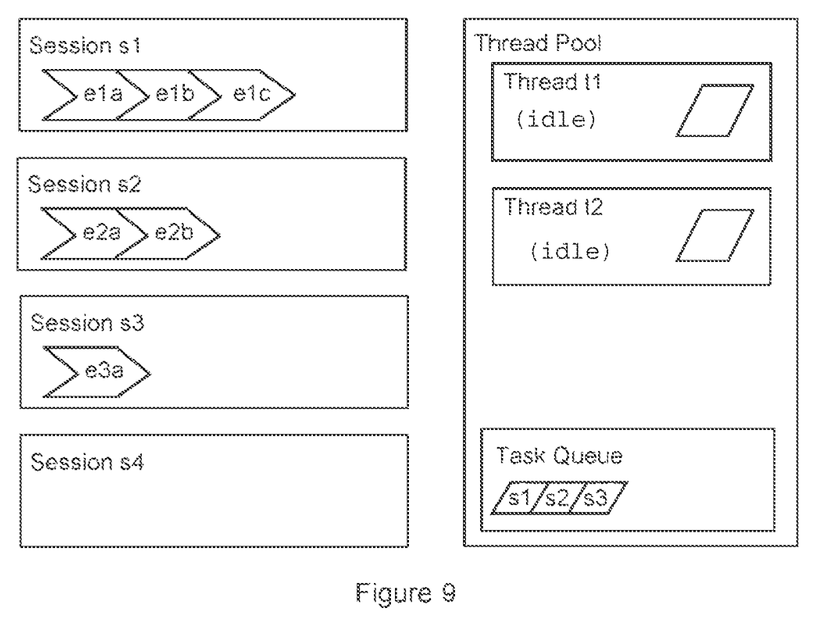
FIGS. 9 to 12 provide an example of how a plurality of events may be handled according to the invention.

FIGS. 9 to 12 are provided for illustrating how the processing of events are synchronised according to the present invention. In the example there are depicted four application sessions $S_1$ to $S_4$, and a thread pool having two processing threads $t_1$, $t_2$. Referring to FIG. 9, the application sessions $S_1$, $S_2$, $S_3$ and $S_4$ are shown as having three events (e1a, e1b, e1c), two events (e2a, e2b), one event (e3a) and zero events, respectively. Threads $t_1$ and t2 are shown as both being idle and that tasks have been scheduled for application sessions $S_1$, $S_2$ and $S_3$.

Figure 10:
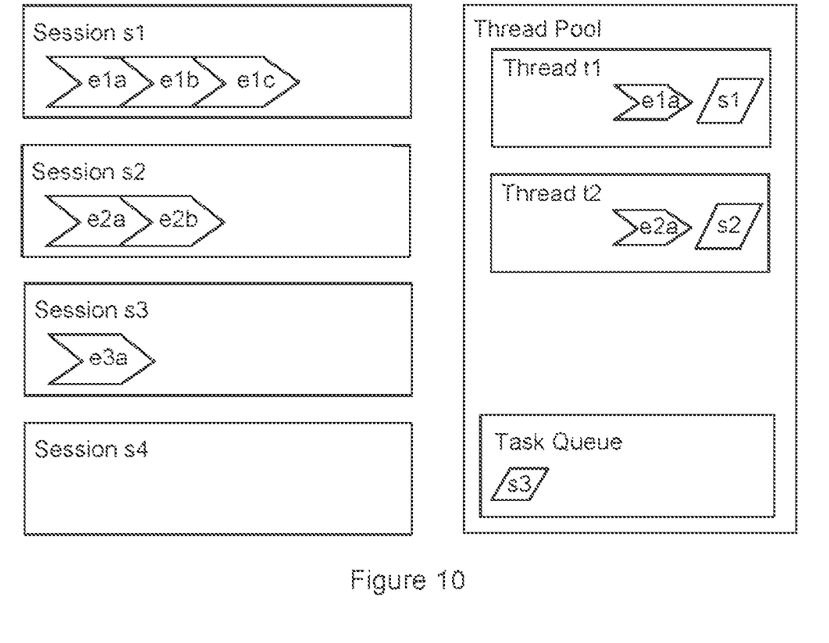

FIG. 10 shows what would happen at this point. Thread $t_1$ executes the task for application session $S_1$ and therefore executes the event handling routine for event e1a from the event queue of application session $S_1$. In parallel, thread $t_2$ executes the task for application session $S_2$ and therefore executes the event handling routine for event e2a from the event queue of application session $S_2$. The tasks are immediately removed from the task queue, leaving just the task for application session $S_3$ in the task queue. Since there are only two threads $t_1$, $t_2$, the task for application session $S_3$ therefore has to wait for one of the threads $t_1$, $t_2$ to become idle.

Figure 11:
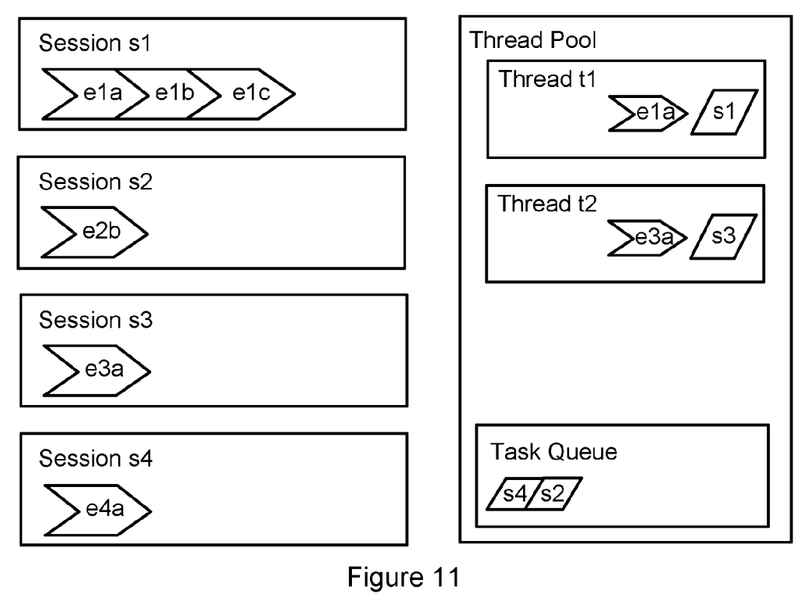

Referring to FIG. 11, it is assumed that some other thread now inserts an event e4a into the event queue for application session $S_4$. Since the event queue for application session $S_4$ is empty, the synchronising unit schedules a new task for application session $S_4$ in the task queue of the thread pool. It is also assumed that after that the thread $t_2$ completes its handling of event e2a. Thread $t_2$ then removes event e2a from the event queue of application session $S_2$. Since the event queue of application session $S_2$ is not empty, the synchronising unit schedules a new task for application session $S_2$ in the task queue. In particular, the synchronising unit schedules a task for the next event e2b from the event queue of application session $S_2$ into the task queue. Furthermore, because thread $t_2$ is now idle, it will start executing the task for application session $S_3$, which was previously in the task queue awaiting processing (as discussed with reference to FIG. 9 above), and therefore processes event e3a.

Figure 12:
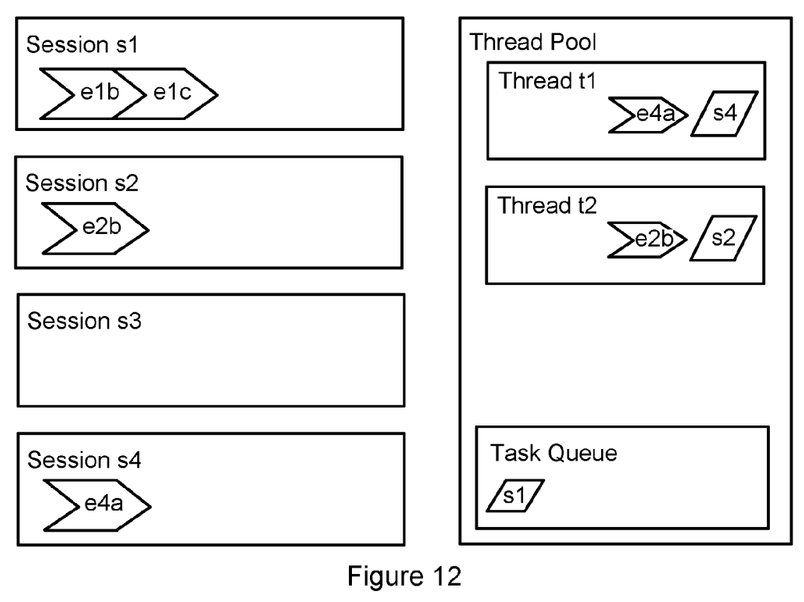

Referring to FIG. 12, it is now assumed that thread $t_1$ finishes handling event e1a. Thread $t_1$ therefore removes event e1a from the event queue of application session $S_1$. Since the event queue of application session $S_1$ is not empty, the synchronising unit schedules a new task for event e1b from application session $S_1$ to the task queue. Because thread $t_1$ is idle, it will start executing the task for application session $S_4$, which as seen from FIG. 11 was waiting in the task queue for processing. As such, thread $t_1$ processes event e4a. It is assumed that soon after, thread $t_2$ finishes handling event e3a from application session $S_3$. It removes event e3a from the event queue of application session $S_3$. Since the event queue of application session $S_3$ is empty, the synchronising unit does not offer a new task for application session $S_3$. Since thread $t_2$ is idle, thread $t_2$ starts executing the task for application session $S_2$, thereby processing event e2b from application session $S_2$.

The procedure described in FIGS. 9 to 12 continues, whereby the synchronising unit ensures that only one event per event queue is scheduled as a task in the task queue at any particular moment in time.

The invention described above therefore enables event synchronization to be provided by ensuring that for each application session only one event is handled at a time.

The use of the above described method greatly simplifies the writing of telecommunication services on the JEE platform. The method has the advantage of solving problems associated with event synchronization, without becoming resource inefficient, while at the same time allowing all resources to be managed.

Although the embodiments described above refer to the resource adapter 11 using its own thread pool 19, the resource adapter 11 may also use the thread pool of the platform. This allows these system resources to be managed.

Furthermore, since the framework is independent of any technology, it can be used in combination with numerous technologies, for example EJBs, servlets and other resource adapters It is noted that the method is preferably implemented as a resource adapter 11 using the JEE Connector Architecture (JCA). The JCA is provided for communicating to legacy systems, but is suited for enabling the event synchronization of the present invention to be used throughout the JEE platform.

The invention has the advantage of not changing the control software associated with the thread pool in any way—the thread pool will continue to try to execute the tasks from the task queue as fast as possible, as is its standard behaviour. However, the synchronizing unit in the session resource adapter of the present invention, which is provided between the event queues and the thread pool, governs that there is at most just one task per event queue. In a conventional system there would be no such mechanism, and each event would equal a task.

It is noted that, although reference is made to the counter being empty when the count value is zero, it will be appreciated that any value can be chosen as a reference to indicate that the counter is empty.

It is also noted that, although the flow charts show certain steps being performed in a particular order, some of these steps may be performed in a different order without departing from the scope of the invention as defined in the appended claims.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of synchronising the processing of events associated with application sessions in a telecommunications processing platform, the telecommunications processing platform having a plurality of processing threads for handling multiple tasks in parallel, the tasks being stored in a task queue, the method comprising:
  storing an inserted event in an event queue associated with a particular application session;
  assigning a task to only one event in said event queue after determining that the inserted event is a first event in the event queue, wherein said storing and said determining comprise indivisible actions; and
  scheduling the task by storing it in the task queue.

2. The method as claimed in claim 1 further comprising:
  removing a processed event from the event queue associated with the particular application session;
  determining if the event queue is empty and, if not, assigning another task to one other event in the event queue.

3. The method as claimed in claim 2 wherein assigning the another task to the one other event comprises assigning the another task to the one other event when the one other event comprises the first event in the event queue.

4. The method as claimed in claim 2 wherein removing the processed event comprises an indivisible action executed without influence from any other processing threads, and wherein determining if the event queue is empty comprises an indivisible action executed without influence from any other processing threads.

5. The method as claimed in claim 4 further comprising using a lock to perform the indivisible actions.

6. The method as claimed in claim 4 further comprising using an atomic counter to perform the indivisible actions.

7. The method as claimed in claim 6 further comprising decrementing a count value of the atomic counter when removing the processed event from the event queue, the count value indicating whether the event queue is empty or whether the processed event is the first event in the event queue.

8. The method as claimed in claim 1 wherein storing the inserted event in the event queue and determining that the inserted event is the first event in the event queue comprise indivisible actions executed without influence from any other processing threads.

9. The method as claimed in claim 8 further comprising using a lock to perform the indivisible actions.

10. The method as claimed in claim 8 further comprising using an atomic counter to perform the indivisible actions.

11. The method as claimed in claim 10 further comprising incrementing a count value of the atomic counter when storing the inserted event in the event queue, the count value indicating whether the event queue is empty or whether the inserted event is the first event in the event queue.

12. The method as claimed in claim 1 wherein the telecommunications processing platform comprises a Java Enterprise Edition (JEE) processing platform.

13. A resource adapter for use in a telecommunications processing platform having a plurality of processing threads for processing multiple tasks in parallel, the tasks being stored in a task queue, the resource adapter disposed in a processor configured to include:
  one or more event queues, each event queue associated with an application session and configured to store an event associated with a corresponding application session;
  a synchronising unit configured to synchronise the processing of events in an event queue, the synchronising unit being configured to:
    assign a task to only one event in an event queue after determining that the event comprises a first event in the event queue, wherein said storing and said determining comprise indivisible actions; and
    schedule the task by storing it in the task queue.

14. The resource adapter as claimed in claim 13 wherein the synchronising unit is further configured to:
  remove a processed event from the event queue associated with a particular application session;
  determine if the event queue is empty and, if not, assign a task to one other event in the event queue.

15. The resource adapter as claimed in claim 14 wherein the one other event to which the task is assigned comprises the first event in the event queue.

16. The resource adapter as claimed in claim 13 further comprising an atomic counter, the atomic counter having a count value for indicating whether a corresponding event queue is empty.

17. The resource adapter as claimed in claim 16 wherein the synchronising unit is configured to increment the count value of the atomic counter when storing an event in the event queue.

18. The resource adapter as claimed in claim 16 wherein the synchronising unit is configured to decrement the count value of the atomic counter when removing an event from the event queue.

19. The resource adapter as claimed in claim 13 wherein the event queue comprises a first-in-first-out queue.

20. The resource adapter as claimed in claim 13 wherein the telecommunications processing platform comprises a Java Enterprise Edition (JEE) processing platform.

21. A Java Enterprise Edition (JEE) cluster comprising a resource adapter disposed in a processor for use in a telecommunications processing platform having a plurality of processing threads for processing multiple tasks in parallel, the tasks being stored in a task queue, the processor comprising:
  one or more event queues, each event queue associated with an application session, and configured to store an event associated with a corresponding application session;
  a synchronising unit configured to synchronise the processing of events in an event queue, the synchronising unit being configured to:
    assign a task to only one event in an event queue after determining that the event comprises a first event in the event queue, wherein said storing and said determining comprise indivisible actions; and
    schedule the task by storing it in the task queue.

22. A Java Enterprise Edition (JEE) cluster configured to perform a method of synchronising the processing of events associated with application sessions in a telecommunications processing platform, the telecommunications processing platform having a plurality of processing threads for handling multiple tasks in parallel, the tasks being stored in a task queue, the method comprising:
  storing an inserted event in an event queue associated with a particular application session;
  assigning a task to only one event in said event queue after determining that the inserted event is a first event in the event queue, wherein said storing and said determining comprise indivisible actions; and
  scheduling the task by storing it in the task queue.

* * * * *

UNITED STATES PATENT AND TRADEMARK OFFICE
CERTIFICATE OF CORRECTION

| | | |
|---|---|---|
| PATENT NO. | : 9,459,941 B2 | Page 1 of 1 |
| APPLICATION NO. | : 13/383494 | |
| DATED | : October 4, 2016 | |
| INVENTOR(S) | : Zwaal | |

It is certified that error appears in the above-identified patent and that said Letters Patent is hereby corrected as shown below:

On the Title Page

In item (57), under "ABSTRACT", in Column 2, Line 5, delete "Si to Sn. Each application session Si to Sn" and insert -- $S_1$ to $S_n$. Each application session $S_1$ to $S_n$ --, therefor.

In the Specification

In Column 8, Line 6, delete "removing of an" and insert -- removing an --, therefor.

Signed and Sealed this
Nineteenth Day of March, 2019

Andrei Iancu
*Director of the United States Patent and Trademark Office*